US012211660B2

(12) United States Patent
Brosas et al.

(10) Patent No.: US 12,211,660 B2
(45) Date of Patent: Jan. 28, 2025

(54) FUSE ASSEMBLY USING COATED WOUND WIRE AND SACRIFICIAL CORE

(71) Applicant: Littelfuse, Inc., Chicago, IL (US)

(72) Inventors: Keon Mayson Brosas, Laguna (PH); Marko Arciaga, Malvar (PH); Victor Oliver Tabell, San Pablo (PH); Irian A. Chua, Santo Tomas (PH)

(73) Assignee: Littelfuse, Inc., Chicago, IL (US)

( * ) Notice: Subject to any disclaimer, the term of this patent is extended or adjusted under 35 U.S.C. 154(b) by 78 days.

(21) Appl. No.: 18/136,576

(22) Filed: Apr. 19, 2023

(65) Prior Publication Data

US 2023/0343537 A1 Oct. 26, 2023

Related U.S. Application Data

(60) Provisional application No. 63/334,897, filed on Apr. 26, 2022.

(51) Int. Cl.
*H01H 69/02* (2006.01)
*H01H 85/06* (2006.01)
*H01H 85/08* (2006.01)

(52) U.S. Cl.
CPC ............ *H01H 69/02* (2013.01); *H01H 85/06* (2013.01); *H01H 85/08* (2013.01)

(58) Field of Classification Search
CPC ........ H01H 69/02; H01H 85/06; H01H 85/08; H01H 85/22; H01H 85/02; Y10T 29/49107
See application file for complete search history.

(56) References Cited

U.S. PATENT DOCUMENTS 6,191,678 B1 * 2/2001 Edwards ............ H01H 85/0418 337/228
9,117,615 B2 * 8/2015 Salonga ............... H01H 85/185
11,355,298 B2 * 6/2022 Enriquez ................ H01H 69/02
2010/0060406 A1 * 3/2010 Kim ..................... H01H 85/147 337/187

* cited by examiner

*Primary Examiner* — Donghai D Nguyen
(74) *Attorney, Agent, or Firm* — KDW Firm PLLC

(57) ABSTRACT

A fuse assembly includes a housing and a wound wire operable as a fusible element. The housing has a cavity for the fusible element. The fusible element is formed by coating a wire with enamel and wrapping the wire around a core to produce enamel-coated wound wire. The enamel-coated wound wire is attached to the housing. The core is etched away until the core is dissolved and the enamel is stripped away.

13 Claims, 8 Drawing Sheets

100

100

100

100

300

FUSE ASSEMBLY USING COATED WOUND WIRE AND SACRIFICIAL CORE

FIELD OF THE DISCLOSURE

Embodiments of the present disclosure relate to fuses and, more particularly, to the design of the fusible element of the fuse.

BACKGROUND

Fuses are current-sensitive devices designed as the intentional weak link in an electrical circuit. The function of a fuse is to provide discrete component or complete circuit protection by reliably melting under overcurrent conditions and thus safely interrupting the flow of current.

Fuses are selected by evaluating a number of different characteristics. Voltage rating indicates the maximum voltage of the circuit for which the fuse is designed to operate safely in the event of an overcurrent. Interrupting rating (also known as breaking capacity or short circuit rating) is the maximum current which the fuse can safely interrupt at the rated voltage. Time-current characteristics determine how fast the fuse responds to different overcurrents. Current rating is the maximum current which the fuse can continuously carry under specified conditions.

Transient overcurrent conditions are also important fuse characteristics. Transient pulses of inrush current are commonplace in vehicle electrical systems, as one example. The transient overcurrent pulses affect the life of automotive fuses. $I^2t$ is an expression of the available thermal energy resulting from current flow. For fuses, the term is usually expressed as melting, arcing, and total clearing $I^2t$. Melting $I^2t$ is the thermal energy required to melt a specific fuse element. Arcing $I^2t$ is the thermal energy passed by a fuse during the arcing time. The magnitude of arcing $I^2t$ is a function of the available voltage and stored energy in the circuit. Total clearing $I^2t$ is the thermal energy through the fuse from overcurrent inception until current is completely interrupted. Total clearing $I^2t$=(melting $I^2t$)+(arcing $I^2t$).

The fusible element is the part of the fuse that melts in response to the overcurrent condition. The material used, the shape, and the thickness of the fusible element are all factors which affect the above fuse characteristics.

It is with respect to these and other considerations that the present improvements may be useful.

SUMMARY

This Summary is provided to introduce a selection of concepts in a simplified form that are further described below in the Detailed Description. This Summary is not intended to identify key or essential features of the claimed subject matter, nor is it intended as an aid in determining the scope of the claimed subject matter.

An exemplary embodiment of a method in accordance with the present disclosure may include coating, wrapping, adding, and stripping steps. A wire is coated with enamel, the wire to be used as a fusible element of a fuse assembly. The wire is wrapped around a core, resulting in an enamel-coated wound wire. An etchant added to the core causes the core to dissolve. The enamel is then stripped from the enamel-coated wound wire.

Another exemplary embodiment of a fuse assembly in accordance with the present disclosure may include a housing and a wound wire operable as a fusible element. The housing has a cavity for the fusible element. The fusible element is formed by coating a wire with enamel and wrapping the wire around a core to produce enamel-coated wound wire. The enamel-coated wound wire is attached to the housing. The core is etched away until the core is dissolved and the enamel is stripped away from the wound wire.

DETAILED DESCRIPTION

Fuse assemblies are disclosed, as well as manufacturing process steps utilized to produce fusible elements for the fuse assemblies. The fusible element is wound around a core to create wound wire. The fusible element wire is coated with an enamel before being wound around the core. Once the enamel-coated wound wire and core combination are affixed to the fuse assembly, the core is etched away, leaving the coated fusible element in place. The enamel coating is then removed, leaving the fusible element wire in place. Soldering issues resulting from using yarn core are avoided. The $I^2T$ and breaking capacity characteristics of the fuse assemblies are maintained. The manufacturing methods are employed on split body and FR4 WIA fuse assemblies.

For the sake of convenience and clarity, terms such as "top", "bottom", "upper", "lower", "vertical", "horizontal", "lateral", "transverse", "radial", "inner", "outer", "left", and "right" may be used herein to describe the relative placement and orientation of the features and components, each with respect to the geometry and orientation of other features and components appearing in the perspective, exploded perspective, and cross-sectional views provided herein. Said terminology is not intended to be limiting and includes the words specifically mentioned, derivatives therein, and words of similar import.

Figure 1B:
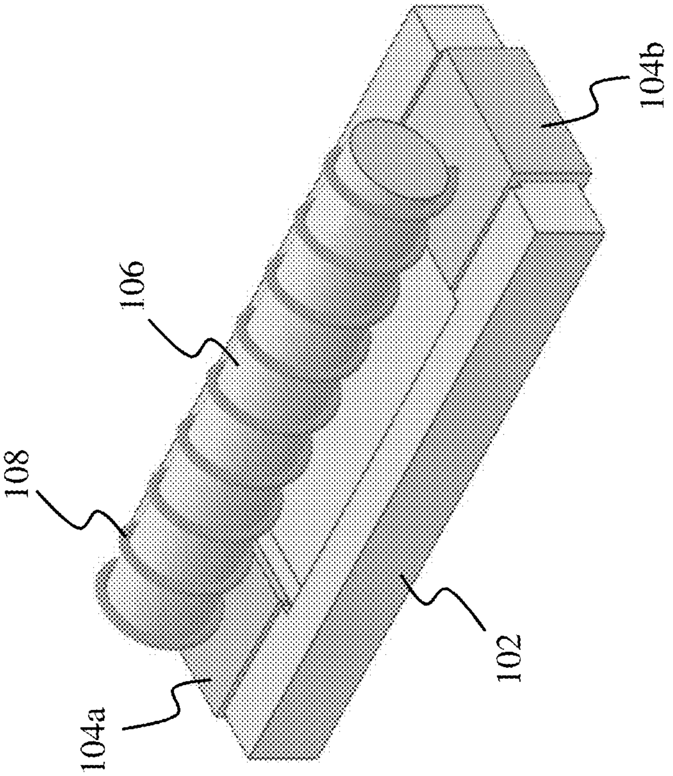
FIGS. 1A-1F are diagrams illustrating a split body design fuse assembly, in accordance with exemplary embodiments.
Figure 1A:
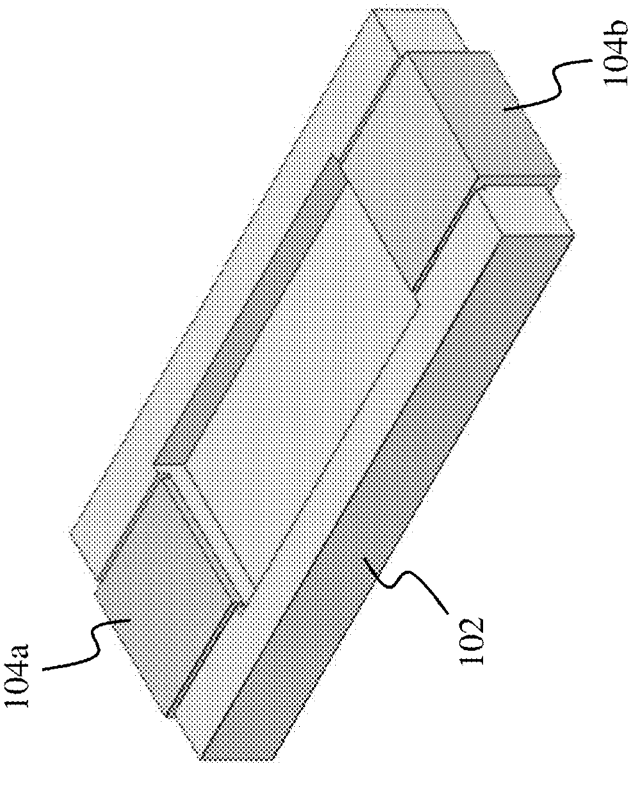
Figure 1D:
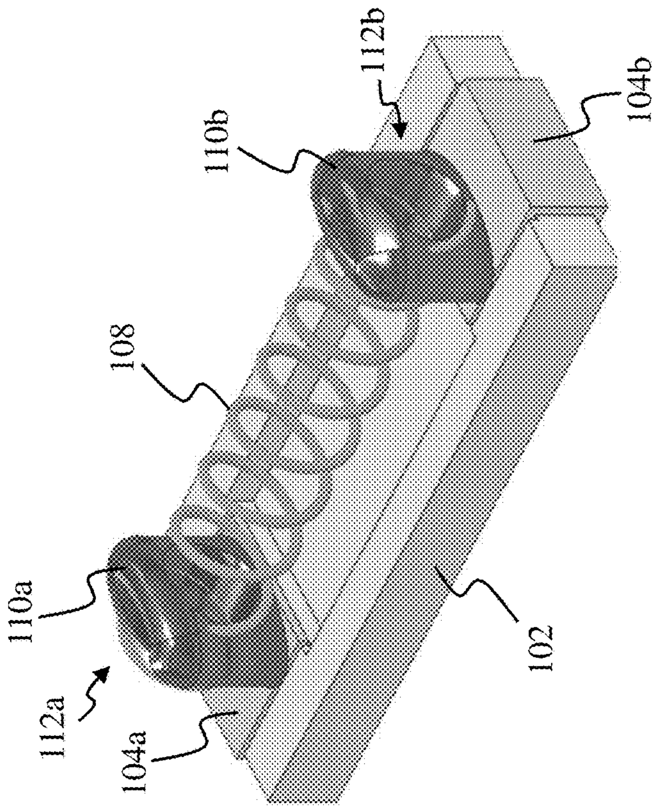
Figure 1C:
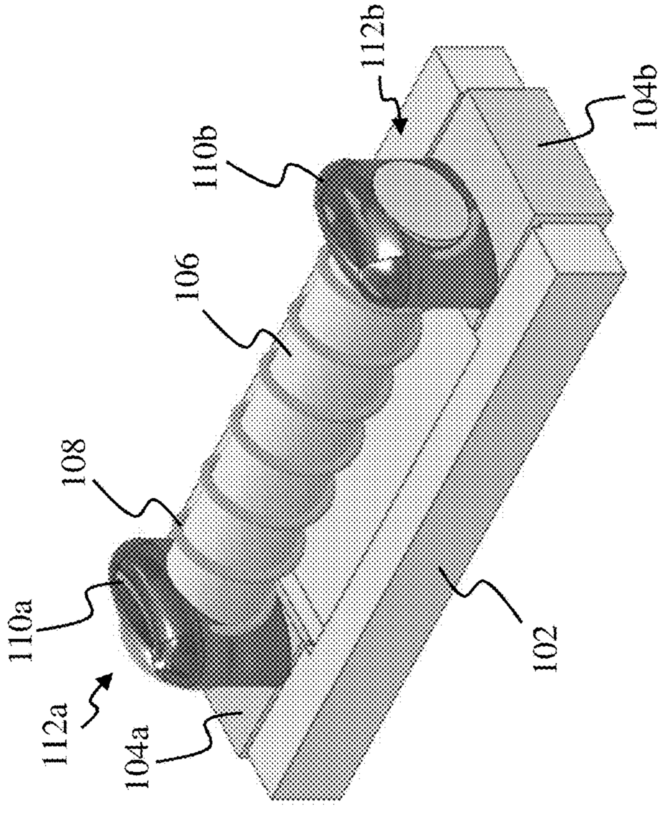
Figure 1F:
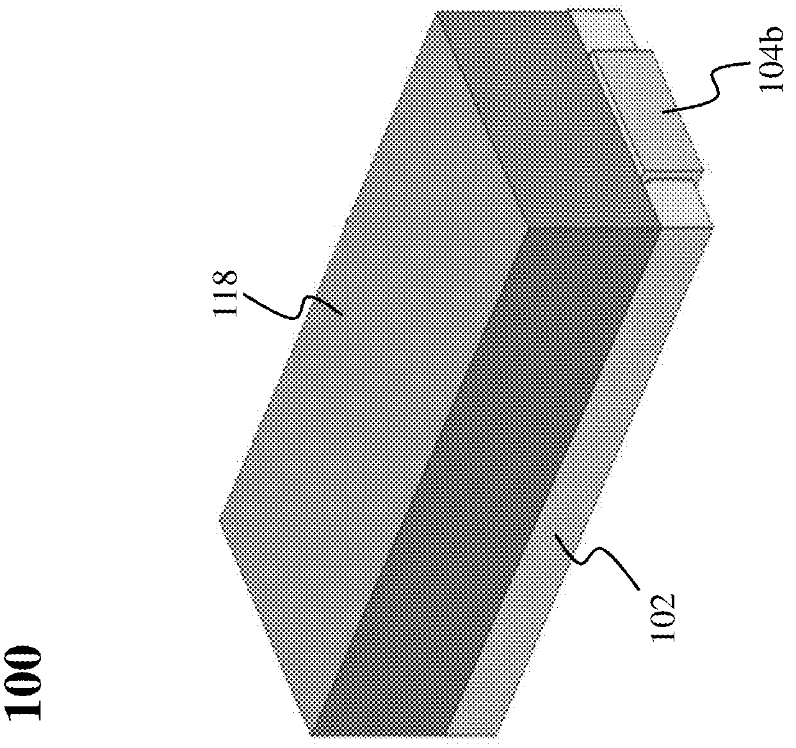
Figure 1E:
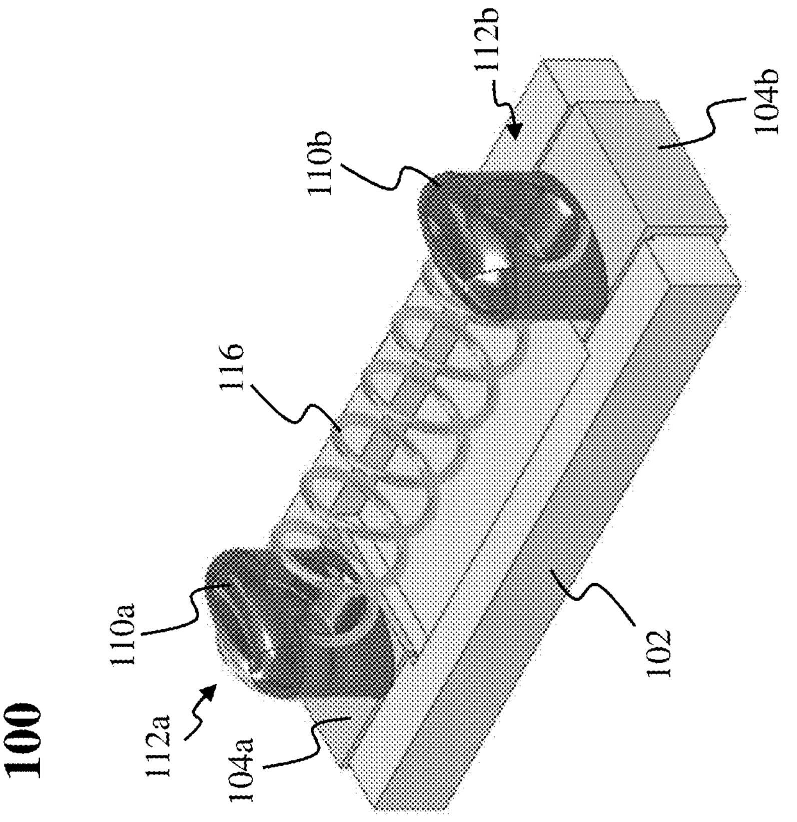
Figure 2:
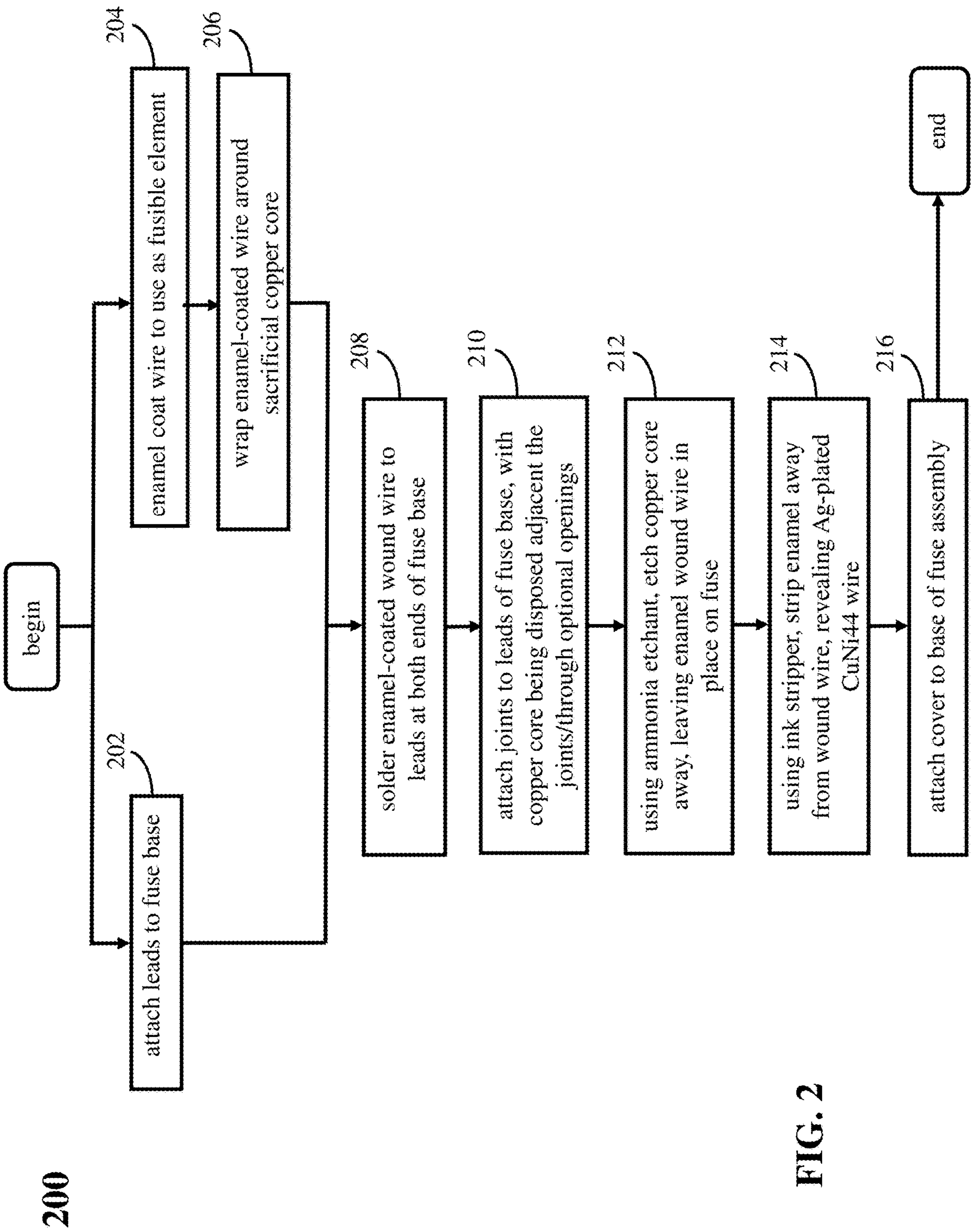
FIG. 2 is a flow diagram illustrating steps for manufacturing the fuse assembly of FIGS. 1A-1F, in accordance with exemplary embodiments.

FIGS. 1A-1F are representative drawings of a split body fuse assembly 100 (hereinafter, "fuse assembly 100") and FIG. 2 illustrates the process steps 200 for manufacturing the fuse assembly 100, according to exemplary embodiments. A split body fuse is one in which the housing consists of a base portion and a cover portion. FIGS. 1A-1F show the fuse assembly 100 in various stages of manufacture while the flow diagram of FIG. 2 explains the coreless wound wire process steps 200 in detail. The manufacturing steps involve the creation of a robust fusible element that satisfies both high $I^2T$ value and high breaking capacity for the fuse assembly 100.

Coreless wound wire is a wire wound on its own and not disposed around a core. In exemplary embodiments, the fuse assembly 100 and the process steps 200 for making the fuse assembly employ a temporary core, one that will be etched away and thus not remain part of the fuse assembly. In non-limiting embodiments, the fusible element resulting from the manufacturing steps described below is a silver-plated copper-nickel alloy. In other embodiments, the fusible element is silver-plated CuNi44. The CuNi44 alloy, characterized by a high electrical resistance, high ductility, and good corrosion resistance, and is suitable for use at temperatures up to 400° C. Nevertheless, the principles of the fuse assembly 100 as well as the process steps 200 for making the fuse assembly may employ fusible elements made from other materials.

In FIG. 1A, the fuse assembly 100 features a fuse base 102 with a pair of leads 104*a* and 104*b* (collectively, "leads 104"). The leads 104 are disposed on opposite ends of the fuse base 102. In a separate manufacturing step not shown in the drawings, a wire is coated with enamel, resulting in an enamel-coated wire. In exemplary embodiments, the wire is the fusible element of the fuse assembly 100, that is, the part of the fuse assembly that breaks during an overcurrent event. Once coated with enamel, the wire is wrapped around a core and is thus wound wire.

FIG. 1B shows the enamel-coated wound wire 108 wrapped around a core 106. In exemplary embodiments, the core 106 is long enough to be disposed at either end on the leads 104, with one end of the core being seated on lead 104*a* and the other, opposing end of the core being seated on lead 104*b* as shown. In exemplary embodiments, the core 106 is made of copper or copper alloy, known in the configuration as a sacrificial copper because the copper material of the core will be etched away and will not be part of the fuse assembly 100 in its final form. The core 106 enables the wire to be wound into a spiral-like configuration. In exemplary embodiments, the core 106 enables the enamel-coated wire 108 to easily be soldered to the leads 104. Further, in exemplary embodiments, the enamel coating does not prevent soldering of the enamel-coated wire 108 to the leads 104. In prior art fuse assemblies, a yarn core is used to wind the wire, which risks a poor solder joint attachment to the leads.

Turning to FIG. 1C, joint 110*a*, optionally having opening 112*a* is attached to lead 104*a* of the fuse base 102; similarly, joint 110*b*, optionally having opening 112*b*, is added to lead 104*b* of the fuse base (collectively, "joints 110" and "openings 112"). In exemplary embodiments, the openings 112 are circular apertures in the center of each joint 110, with a diameter approximately that of the core 106. This allows the core 106 to be fitted at each end through the openings 112 of the joints 110. Where the joints 110 do not include openings 112, the ends of the core 106 would be disposed adjacent to respective joints. The joints 110 are then attached to respective leads 104 of the fuse base 102, with the core 106 being disposed through the openings 112. In some embodiments, the joints 110 are soldered to the leads 104. In other embodiments, the joints 110 are welded to the leads 104.

At this stage, the enamel-coated wound wire 108 is soldered at each end to the leads 104 and the joints 110 are attached to respective leads, whether by welding, soldering, or some other means. In FIG. 1D, the core 106 is etched away, leaving the enamel-coated wound wire 108 in place between the joints 110 and still attached at opposite ends to the leads 104. In exemplary embodiments, an etchant is used to remove the core 106 from the fuse assembly 100. In some embodiments, the etchant is a chemical that dissolves the core 106 but does not affect the enamel coating of the enamel-coated wound wire 108. In one embodiment, the etchant is an ammonia or ammonia-based etchant. In exemplary embodiments, the enamel coating of the enamel-coated wound wire 108 protects the underlying silver-plated copper-nickel alloy material from the ammonia etchant. Thus, during the etchant removal of the core 106, no damage to the enamel-coated wire 108 occurs, in exemplary embodiments.

Turning to FIG. 1E, in exemplary embodiments, the enamel coating is stripped from the enamel-coated wound wire 108, leaving a stripped wound wire 116 in place between the joints 110 and still attached to the leads 104. In exemplary embodiments, the stripping of the enamel away from the underlying silver-plated copper-nickel alloy is performed. In exemplary embodiments, the enamel coating is removed using a chemical that will not affect the underlying material used as the fusible element. In one embodiment, the enamel coating is removed using an ink stripper. Neither the ammonia etchant that removed the core 106 nor the ink stripper that removed the enamel coating from the enamel-coated wound wire 108 adversely affect the connection between the stripped wound wire 116 and the leads 104 and joints 110. The stripped wound wire 116 is the fusible element of the fuse assembly 100, that is, the portion of the fuse assembly that will break upon occurrence of an overcurrent event.

Once the enamel is removed from the enamel-coated wound wire 108, leaving the stripped wound wire 116 in place in the fuse assembly 100, an attach cover 118 is added to the fuse base 102, as illustrated in FIG. 1F. In some embodiments, the cover 118 is attached using an adhesive. In other embodiments, the cover 118 is locked to the fuse base 102. In still other embodiments, the cover 118 is staked to the fuse base 102, such as by a heat staking operation or by using bolts, screws, or other hardware, for example. In still other non-limiting examples, the cover 118 may be attached to the fuse base 102 using ultrasonic welding. The manufacture of the split body fuse assembly 100 is thus complete.

The base 102 and the cover 118 form a cavity inside which the fusible element, the stripped wound wire 116, is seated. The base 102 and the cover 118 may thus be considered the housing of the fuse assembly 100.

The stripped wound wire 116 may have a relatively small diameter or may be a thicker wire having a higher diameter. In the prior art, the fusible element is wound with yarn core to make its wound wire configuration, and there is significant thermal loss from the fusible element to the yarn. This makes it more difficult to reach the wound wire's melting point and open to interrupt low overcurrent levels relative to its fuse rating. Wound wire with yarn core also requires smaller wire diameter to interrupt the same low overcurrent, since wires of larger diameter need relatively more energy to reach their melting points.

In a coreless wound wire configuration, by contrast, there is minimal thermal loss from the fusible element, which allows the fusible element to easily reach its melting point and interrupt low overcurrent levels. Given this difference in behavior under low overcurrent levels, in some embodiments, the coreless wound wire configuration is able to interrupt the low overcurrent levels, even with a larger wire diameter. Consequently, the fuse assembly 100 using a fusible element with a larger wire diameter will have higher $I^2t$ capacity than a fuse assembly with a yarn core because larger wire sizes generally have a higher $I^2t$ capacity than smaller wire sizes.

Further, since coreless wound wire configurations have less thermal loss during a low overcurrent case than their yarn core counterparts, the coreless wound wire configuration only needs low resistance for the ohmic heating to reach its melting point. This means the coreless wound wire configuration will require a shorter effective length and thus less metal volume, due to lower turns per inch (TPI) of the wound wire for the same fuse rating. The less metal volume there is in a fuse, the better that the fuse can safely interrupt a high short circuit overcurrent. In this way, the coreless wound wire configuration of the fuse assembly 100 can achieve a higher breaking capacity than its yarn core counterparts, in some embodiments.

FIG. 2 is a flow diagram illustrating the steps for manufacturing the split body fuse assembly 100 of FIGS. 1A-1F, according to exemplary embodiments. As shown in the flow diagram, the first two steps can be performed separately (in parallel). In one operation, the leads 104 are attached to the fuse base 102 (block 202, FIG. 1A). Separately, the wire selected to be the fusible element is coated in enamel (block 204) and subsequently wound around the sacrificial core 106 (block 206), producing the enamel-coated wound wire 108, as shown in FIG. 1B.

The separately configured elements of the fuse assembly 100 are then brought together in the next step. The enamel-coated wound wire 108 is soldered to the leads 104 at both ends of the fuse base 102 (block 208, FIG. 1B). The joints 110 are attached to the leads 104 of the fuse base 102, whether by welding or soldering, with the core 106 being disposed through the optional openings 112 of the joints (if present) or adjacent the joints (block 210, FIG. 1C). The core 106 is then etched away, using an ammonia etchant. The effect of etching dissolves the core 106, leaving the enamel-coated wound wire 108 in place between the two leads 104 and joints 110 (block 212, FIG. 1D). Next, the enamel is stripped away from the enamel-coated wound wire 108, leaving the stripped wound wire 116 made of the silver-plated copper-nickel alloy (block 214, FIG. 1E). The stripped wound wire 116 becomes the fusible element of the fuse assembly 100. Finally, the cover 118 is attached to the fuse base 102 (block 216, FIG. 1F), thus completing the manufacturing steps of the fuse assembly 100.

Although the above fuse assembly 100 is of the split body type, the principles shown and described herein can be used on different fuse assemblies. Although the core 106, wound with the enamel-coated wound wire 108 was mounted on the leads 104, the above principles can be applied to many other fuse assemblies. As a second example, a FR4-type fuse assembly is shown and described below. FR4 is shorthand for Flame Retardant 4, which is a material best known for use in printed circuit boards. FR4 may also be used in fuse assemblies. Wire-in-air (WIA) is a technique used in the manufacture of some fuse assemblies.

Figure 3A:
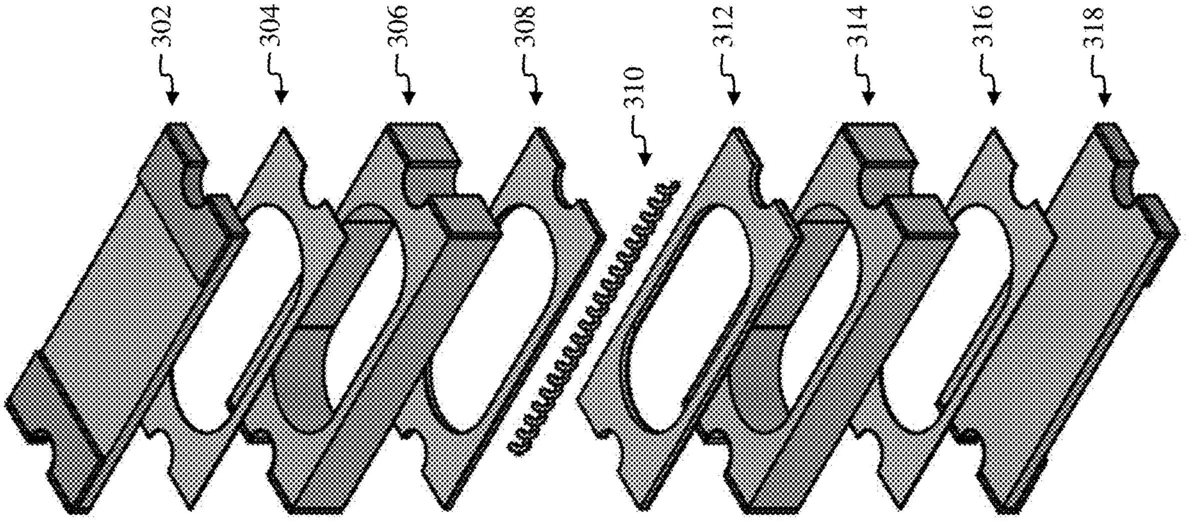
FIGS. 3A-3E are diagrams illustrating an FR4 fuse assembly, in according with exemplary embodiments.
Figure 3B:
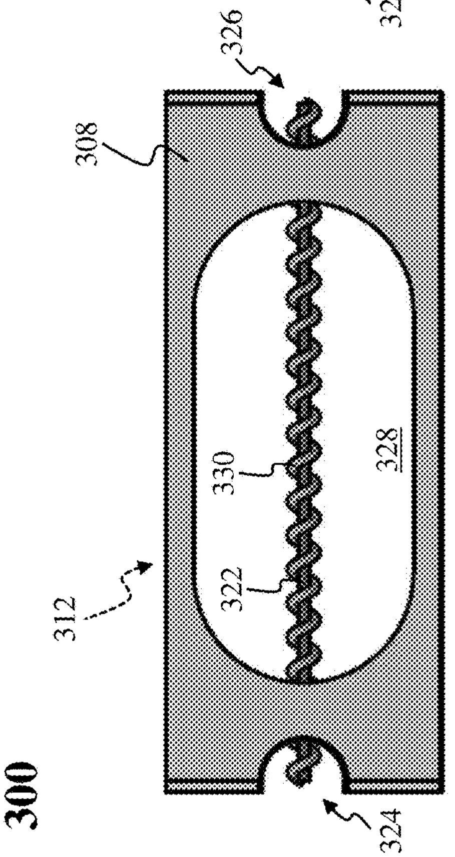
Figure 3C:
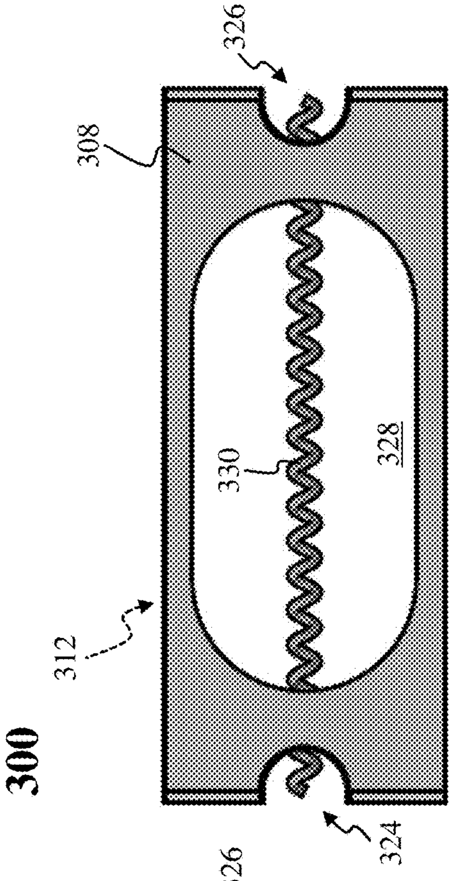
Figure 3D:
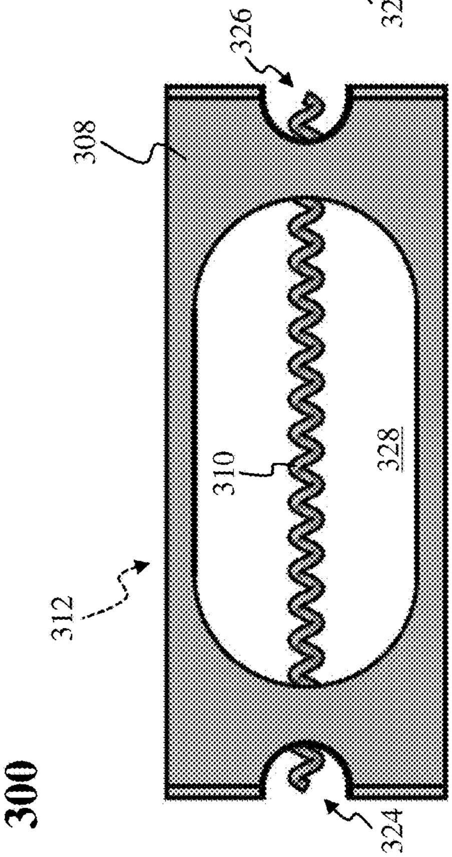
Figure 3E:
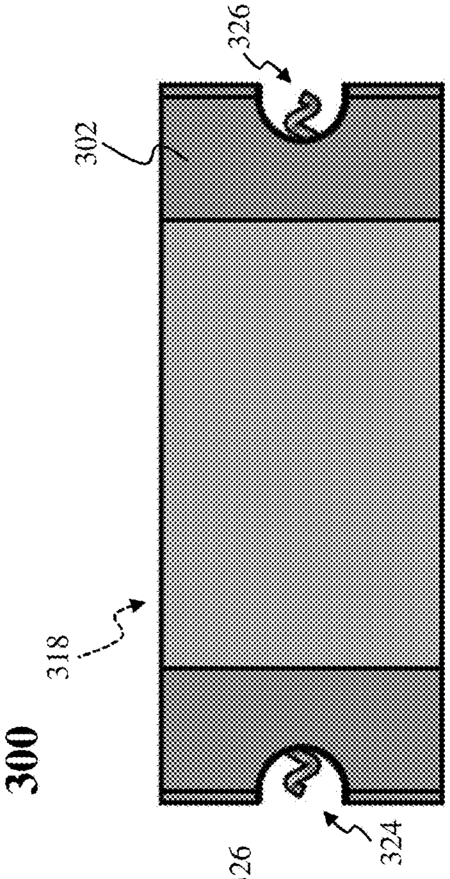
Figure 4:
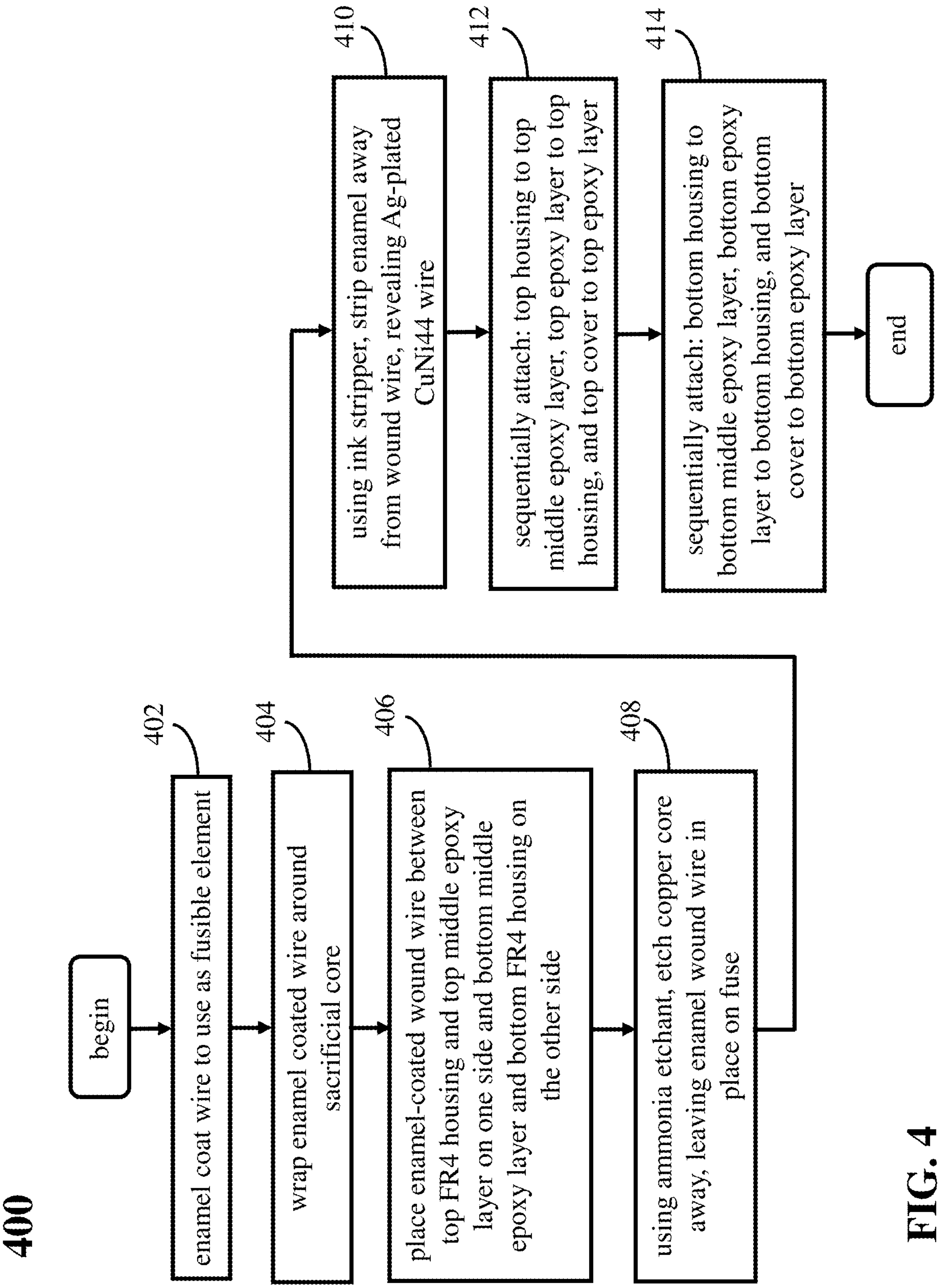
FIG. 4 is a flow diagram illustrating steps for manufacturing the fuse assembly of FIGS. 3A-3E, in accordance with exemplary embodiments.

FIGS. 3A-3E are representative drawings of an FR4 WIA fuse assembly 300 (hereinafter, "fuse assembly 300") and FIG. 4 illustrates the process steps 400 for manufacturing the fuse assembly 300, according to exemplary embodiments. FIG. 3E shows an exploded view of the fuse assembly 300, FIGS. 3B-3E show the fuse assembly 300 in various stages of manufacture, and the flow diagram of FIG. 4 explains the coreless wound wire process steps 400 in detail. The manufacturing steps involve the creation of a robust fusible element that satisfies both high $I^2T$ value and high breaking capacity for the fuse assembly 300. In exemplary embodiments, the fusible element is a silver-plated copper-nickel alloy, such as silver-plated CuNi44.

The exploded view of FIG. 3A shows the components of the fuse assembly 300. A top cover 302 is disposed over a top epoxy layer 304, which is disposed over a top housing 306. Similarly, a bottom housing 314 is disposed over a bottom epoxy layer 316, which is disposed over a bottom cover 318. In the middle, a wound wire 310 is sandwiched between two layers, a top middle epoxy layer 308 and a bottom middle epoxy layer 312. The wound wire 310 is the fusible element of the fuse assembly 300. The sandwiched middle portions 308, 310, and 312 are then disposed between the top housing 306 and the bottom housing 314. In exemplary embodiments, the top cover 302, top housing 306, bottom housing 314, and bottom cover 320 are made of FR4 material, such as is used for printed circuit boards.

With the exception of the top cover 302 and the bottom cover 318, the intermediate layers feature an opening that forms a cavity inside which the wound wire 310 is disposed. At least the top housing 306 and the bottom housing 314, which have some thickness and thus creates some volume to the cavity, may be considered part of the housing of the fuse assembly 300. The top cover 302 and the bottom cover 318 are also part of the housing of the fuse assembly. The exploded perspective view of FIG. 3A is helpful for understanding the overhead view drawings in FIGS. 3B-3E.

In a separate manufacturing step not shown in the drawings, the wire is coated with enamel, resulting in an enamel-coated wire. In exemplary embodiments, the wire is the fusible element of the fuse assembly 300, that is, the part of the fuse assembly that breaks during an overcurrent event. Once coated with enamel, the wire is wrapped around a core and is thus wound wire. Thus, there are two motivations for using the sacrificial core: 1) to form the coreless fusible element, a wound wire: and 2) the sacrificial core remnants will seal the terminals to avoid chemical seep during the plating process, a contrast to the prior art approach using yarn core, which is prone to chemical seep.

In the overhead view of FIG. 3B, the top middle epoxy layer 308 is shown, with the bottom middle epoxy layer 312 indicated as being "behind" the top middle epoxy layer. In between the two epoxy layers 308 and 312, and visible in an aperture 328, an enamel-coated wire 330 is wound around a core 322 (hereinafter, "enamel-coated wound wire 330" or "wound wire 330"). In exemplary embodiments, the wound wire 330 and core 322 combination are pressed in between the top middle epoxy layer 308 and the bottom middle epoxy layer 312. In exemplary embodiments, the core 322 is made of copper or copper alloy, known in the configuration as a sacrificial copper because the copper material of the core will be etched away and will not be part of the fuse assembly 300 in its final form. The core 322 enables the wire to be wound into a spiral-like configuration.

The top middle epoxy layer 308 and the bottom middle epoxy layer 312 each have carved out a first terminal opening 324 at one end and a second terminal opening 326 at an opposite end. In exemplary embodiments, the wound wire 330 and core 322 are visible at both the first terminal opening 324 and at the second terminal opening 326. In other words, the wound wire 330 and core 322 combination extend beyond the length of the aperture 328 and into the first terminal opening 324 and the second terminal opening 326. In exemplary embodiments, the length of the wound wire 330 and core 322 combination is approximately the same as the length of the top middle epoxy layer 308 and the bottom middle epoxy layer 312.

Turning to FIG. 3C, the core 322 is etched away, leaving the enamel-coated wound wire 330 in place between the first terminal opening 324 and the second terminal opening 326. In exemplary embodiments, an etchant is used to remove the core 322 from the fuse assembly 300. In some embodiments, the etchant is a chemical that dissolves the core 322 but does not affect the enamel coating of the enamel-coated wire 330. In one embodiment, the etchant is an ammonia etchant. In exemplary embodiments, the enamel coating of the enamel-coated wire 330 protects the underlying silver-plated copper-nickel alloy material from the ammonia etchant. Thus, during the etchant removal of the core 322, no damage to the enamel-coated wire 330 occurs, in exemplary embodiments. After the etching process, there will be sacrificial core remnants between the first terminal opening 324 and the aperture 328 as well as between the second terminal opening 326 and the aperture 328.

Turning to FIG. 3D, in exemplary embodiments, the enamel coating is stripped from the enamel-coated wound wire 330, leaving the stripped wound wire 310 in place between the first terminal opening 324 and the second terminal opening 326. In exemplary embodiments, the stripping of the enamel away from the underlying silver-plated copper-nickel alloy is performed. In exemplary embodiments, the enamel coating is removed using a chemical that will not affect the underlying material used as the fusible element. In one embodiment, the enamel coating is removed using an ink stripper. Neither the ammonia etchant that removed the core 322 nor the ink stripper that removed the enamel coating from the wound wire 330 adversely affect the stripped wound wire 310. The stripped wound wire 310 is the fusible element of the fuse assembly 300, that is, the portion of the fuse assembly that will break upon occurrence of an overcurrent event.

Once the enamel is removed from the enamel-coated wound wire 330, leaving the stripped wound wire 310 in place in the fuse assembly 300, the other elements of the fuse assembly are attached as shown in FIG. 3A, with the top cover 302 being visible and the bottom cover 318 also being indicated in FIG. 3E. In a non-limiting embodiment, the components of the fuse assembly 300 are attached together using an adhesive. The manufacture of the FR4 WIA fuse assembly 300 is thus complete.

FIG. 4 is a flow diagram illustrating the process steps 400 for manufacturing the FR4 WIA fuse assembly 300 of FIGS. 3A-3E, according to exemplary embodiments. First, a wire of a preferential material, such as silver-plated copper-nickel alloy, is coated with enamel (block 402) and subsequently wound around the sacrificial core 322 (block 404). The enamel-coated wound wire 330 and core 322 combination are then added to the housing of the fuse assembly 300. In exemplary embodiments, the enamel-coated wound wire 330 and core 322 combination are pressed between the top middle epoxy layer 308 and the bottom middle epoxy layer 312 (block 406, FIG. 3B), with the enamel-coated wound wire 330 and core 322 combination extending to the first terminal opening 324 and the second terminal opening 326. The core 322 is then etched away, using an ammonia etchant, with the enamel-coated wound wire 330 being left in place in the aperture 328 between the first terminal opening 324 and the second terminal opening 326 (block 408, FIG. 3C). Next, the enamel is stripped away from the enamel-coated wound wire 330, leaving the stripped wound wire 310 made of the silver-plated copper-nickel alloy (block 410, FIG. 3D). The stripped wound wire 310 becomes the fusible element of the fuse assembly 300. The top housing 306 is then attached to the top middle epoxy layer 308, the top epoxy layer 304 is attached to the top housing 306, and the top cover 302 is attached to the top epoxy layer 304 (block 412). Similarly, the bottom housing 314 is attached to the bottom middle epoxy layer 316, the bottom epoxy layer 316 is attached to the bottom housing 314, and the bottom cover 320 is attached to the bottom epoxy layer 316 (block 414), thus completing the manufacturing steps of the fuse assembly 100 (FIG. 3E).

Figure 5A:
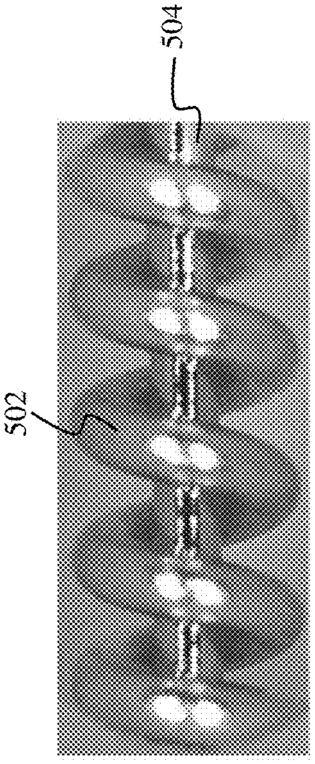
FIGS. 5A-5C are diagrams illustrating a fusible element during multiple steps of manufacture, in accordance with exemplary embodiments.
Figure 5B:
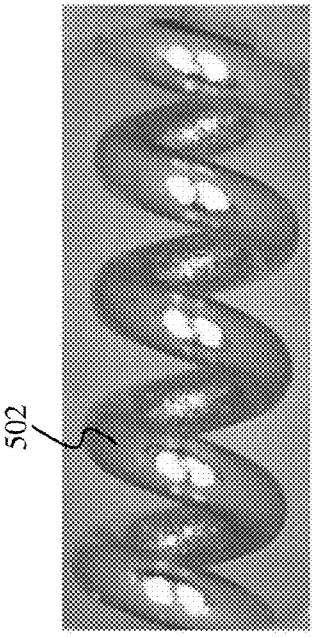
Figure 5C:
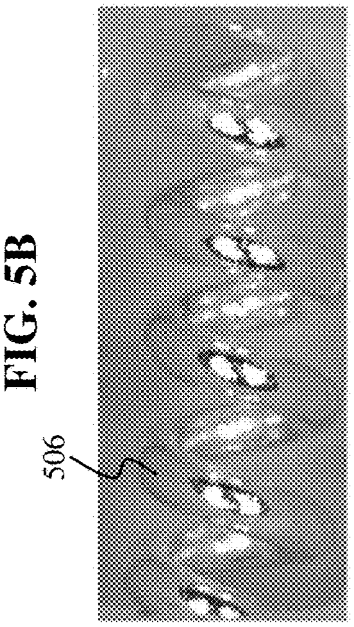

FIGS. 5A-5C are close-up views of a wound wire, similar to that used in the fuse assemblies 100 and 300, according to exemplary embodiments. In FIG. 5A, an enamel-coated wound wire 502 is shown, wound around a core 504. In FIG. 5B, the core 504 is etched away, leaving the enamel-coated wound wire 502. In FIG. 5C, the enamel coating of the enamel-coated wound wire 502 is stripped away, leaving a stripped wound wire 506. In exemplary embodiments, despite the etching and stripping operations, the stripped wound wire 506 is in good condition for use as a fusible element of a fuse assembly.

Empirical studies have shown that, where the wire making up the fusible element is not coated in enamel, the etching operations used to remove the core will cause abrasion to the surface of the fusible element. Experiments using silver-plated copper nickel alloy, such as CuNi44, as the wound wire show damage to the surface of the wound wire. The abrading of the fusible element surface make the fusible element less desirable as part of a fuse assembly. The fuse assemblies 100 and 300, as well as the respective process steps 200 and 400 provide a beneficial alternative to address these experimental results.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure makes reference to certain embodiments, numerous modifications, alterations, and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

The invention claimed is:

1. A method comprising:

coating a wire with enamel, wherein the wire is to be used as a fusible element of a fuse assembly;

wrapping the wire around a core, resulting in an enamel-coated wound wire;

adding an etchant to the core, causing the core to dissolve; and stripping the enamel from the enamel-coated wound wire.

2. The method of claim 1, further comprising:

soldering the enamel-coated wound wire to a first lead and a second lead of a fuse base.

3. The method of claim 2, further comprising attaching the first lead to a first end of the fuse base; and attaching the second lead to a second end of the fuse base, wherein the first end is on an opposite side of the fuse base from the second lead.

4. The method of claim 3, further comprising:

attaching a first joint to the first lead of the fuse base, the first joint having a first opening; and attaching a second joint to the second lead of the fuse base, the second joint having a second opening.

5. The method of claim 4, wherein the core is disposed through the first opening and the second opening.

6. The method of claim 4, wherein the first joint is attached to the first lead using solder and the second joint is attached to the second lead using solder.

7. The method of claim 4, wherein the first joint is attached to the first lead by welding and the second joint is attached to the second lead by welding.

8. The method of claim 1, wherein the etchant used to dissolve the core does not affect the enamel.

9. The method of claim 8, wherein the etchant is ammonia-based.

10. The method of claim 1, wherein the stripping operation does not affect the wire.

11. The method of claim 10, wherein the stripping operation is performed using an ink stripper.

12. The method of claim 1, wherein the wire is a silver-plated copper nickel alloy.

13. The method of claim 12, wherein the wire is silver-plated CuNi44.

* * * * *